United States Patent
Fest et al.

(10) Patent No.: US 8,842,216 B2
(45) Date of Patent: Sep. 23, 2014

(54) MOVABLE PIXELATED FILTER ARRAY

(75) Inventors: Eric C. Fest, Tucson, AZ (US); Michael P. Schaub, Tucson, AZ (US); Page E. King, Tucson, AZ (US)

(73) Assignee: Raytheon Company, Waltham, PA (US)

( * ) Notice: Subject to any disclaimer, the term of this patent is extended or adjusted under 35 U.S.C. 154(b) by 204 days.

(21) Appl. No.: 13/599,633

(22) Filed: Aug. 30, 2012

(65) Prior Publication Data
US 2014/0063299 A1  Mar. 6, 2014

(51) Int. Cl.
*H04N 5/225* (2006.01)

(52) U.S. Cl.
USPC .......................................... 348/360; 348/342

(58) Field of Classification Search
USPC .................. 348/335, 340, 342, 360
See application file for complete search history.

(56) References Cited

U.S. PATENT DOCUMENTS

| | | | |
|---|---|---|---|
| 6,226,460 B1 | 5/2001 | Hino et al. | |
| 7,027,091 B1 * | 4/2006 | Reyneri et al. | 348/280 |
| 7,582,857 B2 | 9/2009 | Gruev et al. | |
| 8,049,889 B2 | 11/2011 | Fest | |
| 2007/0291157 A1 * | 12/2007 | Ding et al. | 348/360 |
| 2008/0030611 A1 * | 2/2008 | Jenkins | 348/336 |
| 2010/0149533 A1 * | 6/2010 | Fest | 356/367 |
| 2010/0201831 A1 * | 8/2010 | Weinstein | 348/221.1 |
| 2010/0283885 A1 | 11/2010 | Lin et al. | |
| 2012/0169910 A1 | 7/2012 | Singh | |
| 2012/0194728 A1 | 8/2012 | Kim | |

OTHER PUBLICATIONS

Chipman, Russell A., "Polarmietry," Handbook of Optics, vol. 2: Devices, Measurements & Properties, Jan. 1, 1995, 36 pages.

* cited by examiner

*Primary Examiner* — Timothy J Henn
(74) *Attorney, Agent, or Firm* — Lando & Anastasi, LLP

(57) ABSTRACT

An optical imaging system and method including a movable pixelated filter array, a shutter mechanism to which the pixelated filter array is attached, and a controller configured to implement a data reduction algorithm. The shutter mechanism is configured to move the pixelated filter array into and out of the optical path, and the data reduction algorithm allows the controller to account for axial and/or lateral misalignment of the filter array relative to the imaging detector array or its conjugate. In certain examples, the controller is further configured to use the data reduction algorithms also to perform wavefront sensing, for example to estimate wavefront error.

15 Claims, 7 Drawing Sheets

MOVABLE PIXELATED FILTER ARRAY

BACKGROUND

Imaging detectors, such as focal plane arrays, generally include an array of pixels, each pixel including a photodetector that generates a signal responsive to light generated or reflected by an object. These signals are collected and combined such that a digital image of the object can be created. Pixelated filter arrays positioned in a fixed location over the detector array are widely used in commercial imaging systems to provide hyperspectral or polarimetric capability. For example, digital cameras use fixed-in-place pixelated filter arrays for color (RGB) photography. However, these filters reduce the amount of light that reaches the imaging pixel (for example, a red filter reflects blue and green light). Polarimeters can be used to analyze the polarization components of light. Some polarimeters use two or more linear polarizers that filter at least half of the incoming light and direct the remaining light to a focal plane. As a result, the brightness of the image at the focal plane is substantially reduced (e.g., by about half).

U.S. Pat. No. 8,049,889 describes a switchable imaging polarimeter in which the device can operate in "polarimeter" or "non-polarimeter" modes. In the polarimeter mode, the system uses non-pixelated polarization filters to obtain polarimetric information about a scene, which reduces the system transmittance. In the non-polarimeter mode, the system does no polarization filtering and has high transmittance. The system switches between modes using an electro-optic switch. U.S. Pat. No. 6,226,460 describes a movable filter device that uses a mechanical rotary swing arm to move the filters.

SUMMARY OF INVENTION

Fixed-in-place pixelated filter arrays (of color filters and/or polarization filters) are undesirable for use in sensitive applications where high signal strength is necessary or greatly desired because they always reduce the system transmittance. For example, it is not desirable to use fixed-in-place pixelated filter arrays in missile seekers because they permanently reduce signal strength and therefore range. Aspects and embodiments are directed to a movable pixelated filter array that operates in a combination with a shutter mechanism and a data reduction algorithm, as discussed in detail below. The pixelated filter array may be attached to the shutter mechanism to allow the array to be moved into and out of the optical path as needed, thus providing the system with the ability to operate in a high-transmittance mode or filter mode as needed. Embodiments of the data reduction algorithm allow and compensate for axial and lateral misalignment of the filter array relative to the detector plane or its conjugate, making it easier to add the movable pixelated filter array to existing imaging systems, as discussed further below.

According to one embodiment, an optical imaging system comprises an imaging detector array configured to provide image signals responsive to electromagnetic radiation impinging on the imaging detector array, a shutter mechanism, a pixelated filter array coupled to the shutter mechanism, the shutter mechanism being configured to selectively move the pixelated filter array into and out of an optical path leading to the imaging detector array, and a controller coupled to the imaging detector array and configured to receive and process the image signals to compensate for axial and/or lateral misalignment of the pixelated filter array with respect to at least one of the imaging detector array and a conjugate image plane of the imaging detector array.

In one example the imaging detector array is a focal plane array comprising a plurality of detector pixels arranged in a grid format. The pixelated filter array may comprise a plurality of filter pixels arranged in a grid format, the filter pixels being approximately the same size as the detector pixels. The optical imaging may further comprise foreoptics configured to focus the electromagnetic radiation onto the imaging detector, the optical path being between the foreoptics and the imaging detector. In one example the electromagnetic radiation is infrared radiation. In another example the controller is configured to compute a data reduction matrix based at least in part on a known misalignment of the pixelated filter array, and to process the image signals using the data reduction matrix. In another example the shutter mechanism includes a position encoder configured to provide a position of the pixelated filter array in the optical path, wherein the controller is coupled to the position encoder and configured to receive the position of the pixelated filter array and to determine the known misalignment of the pixelated filter array. The pixelated filter array may be any one of a Bayer filter array, a polarizer array, or a neutral density array, for example.

According to another embodiment an imaging method comprises selectively moving a pixelated filter array into an optical path of an imaging detector in an imaging system, the imaging detector including a plurality of pixels, measuring a response from the imaging detector when the pixelated filter array is positioned in the optical path to obtain a measurement vector, determining a misalignment of the pixelated filter array with respect to the imaging detector, calculating a data reduction matrix based on the misalignment of the pixelated filter array, and processing the measurement vector using the data reduction matrix to extract selected content from the response of the imaging detector.

In one example of the method determining the misalignment of the pixelated filter array includes receiving axial and/or lateral position information for the pixelated filter array from a position encoder coupled to a mechanism configured to move the pixelated filter array into and out of the optical path. In another example calculating the data reduction matrix includes tracing an unpolarized ray grid through a representation of the imaging system to a center quad super-pixel of the imaging detector, the super-pixel including four pixels of the plurality of pixels, tracing first and second polarized ray grids through the imaging system for at least three of the four pixels of the super-pixel to provide a measurement vector, the first polarized ray grid being at a first linear polarization, and the second polarized ray grid being at a second linear polarization, and based on the measurement vector, determining the data reduction matrix. In one example tracing the first and second polarized ray grids includes setting a power of each ray grid equal to one. In another example tracing the first and second polarized ray grids includes tracing the first and second polarized ray grids through the imaging system for each of the four pixels of the super-pixel to provide the measurement vector. In another example determining the data reduction matrix includes using the measurement vector and known values of the first and second linear polarizations to determine a measurement matrix, and obtaining the pseudoinverse of the measurement matrix to provide the data reduction matrix. The imaging method may further comprise measuring a system transmittance for the pixelated filter array positioned in the optical path, and estimating a wavefront error value based on the system transmittance and the data reduction matrix.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to imaging systems and methods that incorporate the use of a movable digital pixelated filter array. Embodiments include the combination of a pixelated filter array, which may be a bandpass (e.g., Bayer) filter or polarization filter, a shutter mechanism to which the pixelated filter array is attached, and a data reduction algorithm. As discussed in more detail below, the shutter mechanism allows the pixelated filter array to be moved into and out of the optical path as needed, and the data reduction algorithm allow for axial and/or lateral misalignment of the filter array relative to the imaging detector array or its conjugate. In certain embodiments, the data reduction algorithms also provide the ability to perform wavefront sensing, for example to estimate wavefront error, as also discussed further below. Aspects and embodiments allow pixelated filter arrays to be used in sensitive imaging applications, for example, existing and future missile seeker systems to enhance discrimination capability (or resolution) at low cost. Due the system's insensitivity to lateral and/or axial misalignment, the filter array need not be positioned at an image plane, making it easier to incorporate the filter array into existing systems.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
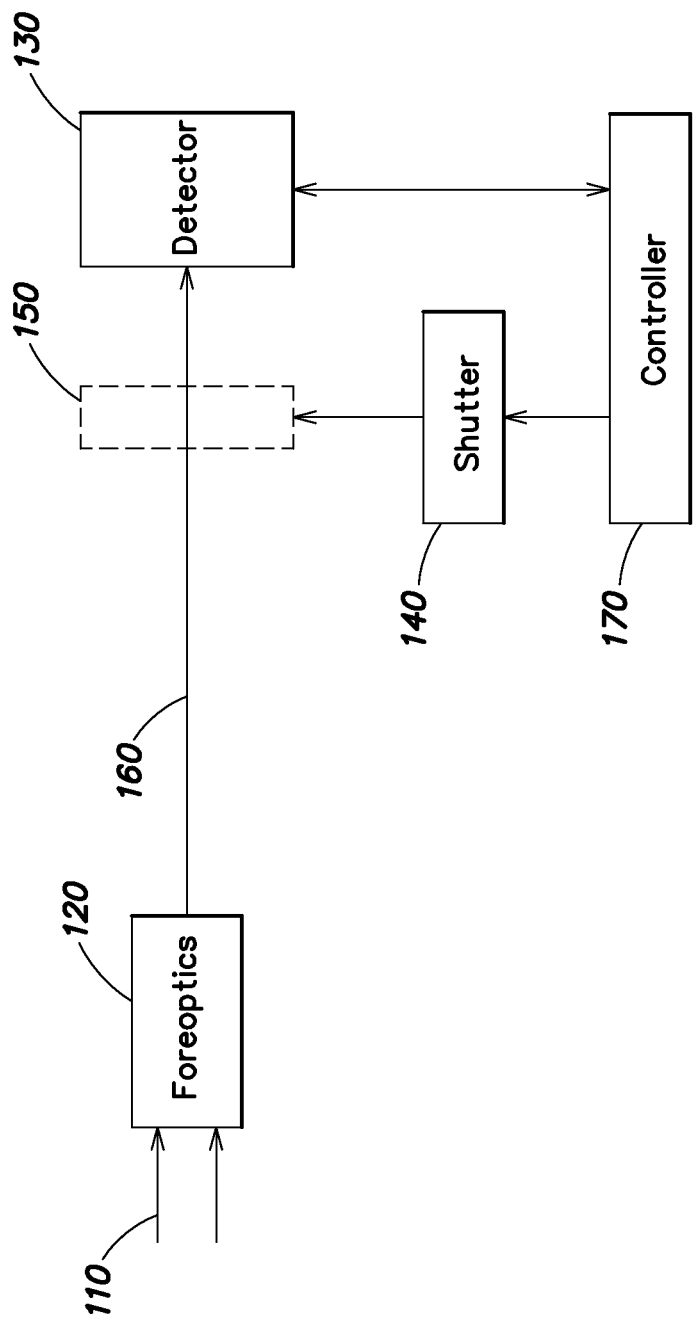
FIG. 1 is a block diagram of one example of an imaging system according to aspects of the invention.

Referring to FIG. 1, there is illustrated a block diagram of one example of an imaging system according to one embodiment. Incoming electromagnetic radiation 110 from a distant object or "scene" is focused by foreoptics 120 toward an imaging detector array 130. In one example the detector array 130 is a focal plane array comprised of a grid array of pixels organized in rows and columns. The electromagnetic radiation 110 may include ultraviolet (UV), visible, and/or infrared radiation in one or more of the near infrared (NIR), shortwave infrared (SWIR), midwave infrared (MWIR), longwave infrared (LWIR), and/or very-longwave infrared (VLWIR) spectral bands. As discussed above, a shutter mechanism 140 is used to move a pixelated filter array 150 into and out of the optical path 160. The shutter mechanism 140 may be operated under the control of a controller 170. The controller may further implement data reduction algorithms, as discussed in more detail below, to accommodate lateral and/or axial misalignment of the filter array 150.

Figure 2:
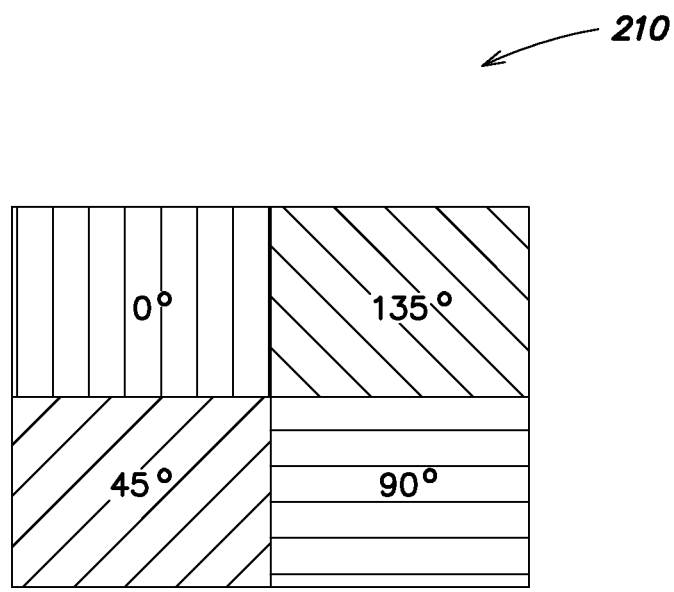
FIG. 2 is a diagram of one example of a pixelated array of linear polarizers.

The pixelated filter array 150 may include an array of polarizers and/or bandpass filters. In one example, the pixelated filter array 150 is a Bayer (RGB) array. In another example the pixelated filter array 150 is an ND array. Pixelated arrays of polarizers and/or bandpass filters are available commercially. FIG. 2 illustrates an example of a portion of a commercially available pixelated array of linear polarizers for polarimetry. Any type of pixelated filter array may be used in various embodiments, depending, for example, on the imaging application.

The shutter mechanism 140 may include any mechanism that can be used to reliably and repeatably move the pixelated filter array 150 into and out of the optical path 160. According to one embodiment, the shutter mechanism 140 has either very good repeatability in position, for example, approximately ±2 micrometers (μm), or a position encoder that reads out the position of the movable part of the shutter mechanism (to which the pixelated filter array 150 is attached) with very good accuracy, for example, approximately ±2 μm. High accuracy in the position of the shutter mechanism may be necessary to accurately know the position of the pixelated filter array 150 in the optical path 160, which information may be used in the data reduction algorithms discussed further below. In examples in which a shutter mechanism with good repeatability in position is selected, the position of the pixelated filter array 150 in the optical path 160 may be very accurately characterized during set-up or calibration of the imaging system. The known position of the pixelated filter array 150 relative to the imaging detector 130 may be used in the data reduction algorithms as discussed below. Alternatively, in examples in which the shutter mechanism 140 includes a position encoder, information about the position of the pixelated filter array 150 may be dynamically provided to the controller 170 to be used in the data reduction algorithms.

As discussed above, the data reduction algorithms may be used to compensate for axial and/or lateral misalignment of the pixelated filter array 150 relative to the imaging detector 130 or an associated image plane. In some examples, axial misalignment refers to misalignment in the z dimension, along the optical path leading to the detector, and lateral misalignment refers to misalignment in the orthogonal x and/or y dimensions. According to one embodiment, a data reduction algorithm includes a data reduction matrix M for each group of pixels. For example, the pixelated filter array, and pixelated detector, may be divided into groups of four pixels (e.g., a 2×2 sub-array of pixels). For the purposes of explanation, the following discussion may generally assume a 2×2 array of pixels; however, those skilled in the art will appreciate, given the benefit of this disclosure, that the process may be scaled for any size array of pixels. The data reduction matrix M is used to compute a vector of desired scene quantities S from the counts output from multiple detectors, which together are expressed as a vector P. Thus, $$\vec{S} = \vec{M} \cdot \vec{P} \quad (1)$$

Examples of the vector S include R, G, B values or Stokes vector elements ($S_0$, $S_1$, $S_2$, $S_3$). M is computed as the pseudo-inverse of a measurement matrix $W_p$:

$$\vec{M} = \vec{W}_p^{-1} \quad (2)$$

$W_p$ is determined by the design of the pixelated filter array.

Figure 3:
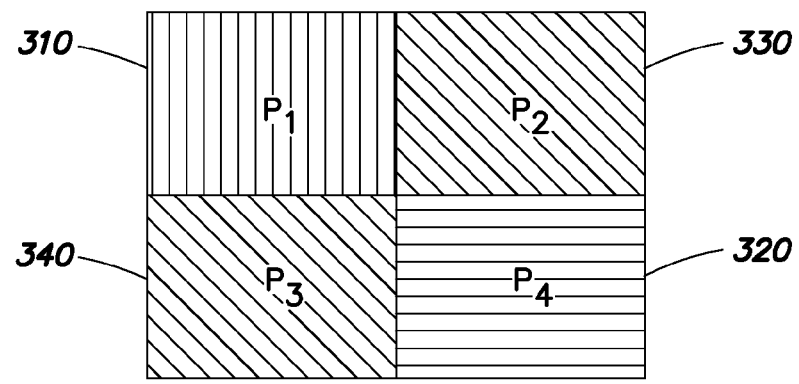
FIG. 3 is a diagram of one example of a perfectly aligned detector array and pixelated Bayer filter array according to aspects of the invention.

For example, for a perfectly aligned RGB Bayer array (illustrated in FIG. 3, in which the detector array includes pixels $P_1$, $P_2$, $P_3$, and $P_4$, and for the filter array, pixel 310 is red, pixel 320 is blue, and pixels 330 and 340 are green), $W_p$ is given by:

$$\vec{P} = \vec{W}_p \cdot \vec{S} = \begin{pmatrix} P_1 \\ P_2 \\ P_3 \\ P_4 \end{pmatrix} = \begin{pmatrix} 1 & 0 & 0 \\ 0 & 1 & 0 \\ 0 & 1 & 0 \\ 0 & 0 & 1 \end{pmatrix} \begin{pmatrix} R \\ G \\ B \end{pmatrix} \quad (3)$$

In Equation (3), R is the red value, G is the green value, B is the blue value, and $P_i$ represents the output counts from the ith pixel. The $P_i$ values are obtained by measuring the outputs of the detector array. M is calculated as the pseudoinverse of $W_p$ and is given by:

$$\vec{M} = W_p^{-1} = \begin{pmatrix} 1 & 0 & 0 & 0 \\ 0 & 1/2 & 1/2 & 0 \\ 0 & 0 & 0 & 1 \end{pmatrix} \quad (4)$$

Accordingly, from Equations (1) and (4):

$$\vec{S} = \vec{M} \cdot \vec{P} = \begin{pmatrix} R \\ G \\ B \end{pmatrix} = \begin{pmatrix} 1 & 0 & 0 & 0 \\ 0 & 1/2 & 1/2 & 0 \\ 0 & 0 & 0 & 1 \end{pmatrix} \begin{pmatrix} P_1 \\ P_2 \\ P_3 \\ P_4 \end{pmatrix} \quad (5)$$

Thus, knowing M, from the measurements P obtained from the detector array, the desired content S can be calculated.

Figure 4:
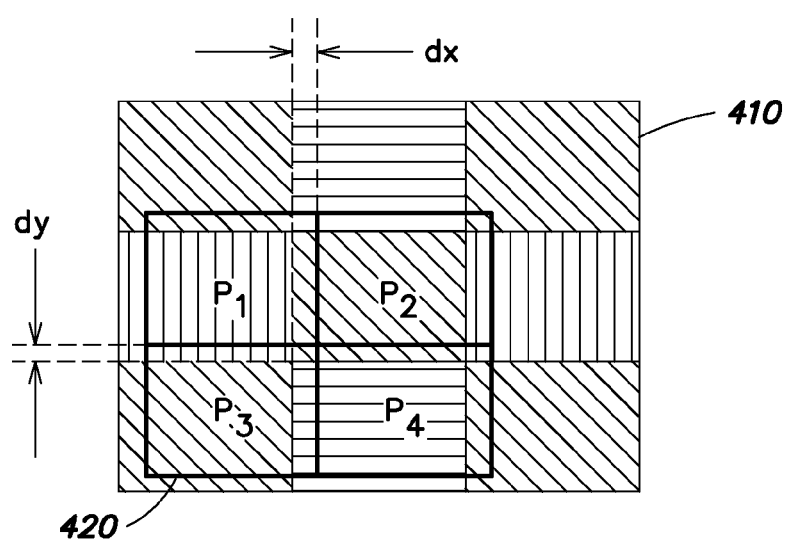
FIG. 4 is a diagram of one example of a laterally misaligned pixelated Bayer filter array according to aspects of the invention.

Considering the example of a lateral (or transverse) misaligned RGB Bayer array, as shown in FIG. 4, Equation (3) becomes:

$$\vec{P} = \vec{W}_p \cdot \vec{S} = \begin{pmatrix} P_1 \\ P_2 \\ P_3 \\ P_4 \end{pmatrix} = \begin{bmatrix} f_{red-1} & f_{green-1} & f_{green-1} \\ f_{red-2} & f_{green-2} & f_{blue-2} \\ f_{red-3} & f_{green-3} & f_{blue-3} \\ f_{ed-4} & f_{green-4} & f_{blue-4} \end{bmatrix} \begin{pmatrix} R \\ G \\ B \end{pmatrix} \quad (6)$$

In Equation (6), $f_{x-i}$ is a function describing the fractional area overlap of filter pixel color x over detector pixel i. Referring to FIG. 4, for this example, $W_p$ can be expressed as:

$$\vec{W}_p = \quad (7)$$

$$\begin{bmatrix} (1-dx)(1-dy) & (1-dy)dx + (1-dx)dy & dxdy \\ (1-dy)dx & (1-dx)(1-dy) + dxdy & (1-dx)dy \\ (1-dx)dy & (1-dx)(1-dy) + dxdy & (1-dy)dx \\ dxdy & (1-dy)dx + (1-dx)dy & (1-dx)(1-dy) \end{bmatrix} \begin{pmatrix} R \\ G \\ B \end{pmatrix}$$

The values dx and dy are expressed in fractions of a pixel and describe the lateral misalignment of the pixelated Bayer filter array 410 relative to the detector array 420 in both the x and y dimensions. The output of each detector pixel $P_i$ is the sum of the output of every filter pixel that overlaps it, weighted by the overlap area.

From Equation (7), M can be computed as the pseudoinverse of $W_p$, and can be used to provide the vector S of desired quantities. For example, for a Bayer array that is laterally misaligned by ¼ pixel in both x and y, M is determined from Equation (7) above, and S is given by:

$$\vec{S} = \begin{pmatrix} R \\ G \\ B \end{pmatrix} = \begin{pmatrix} 3.222 & -1.778 & -1.778 & 1.222 \\ -1.778 & 2.222 & 2.222 & -1.778 \\ 1.222 & -1.778 & -1.778 & 3.222 \end{pmatrix} \begin{pmatrix} P_1 \\ P_2 \\ P_3 \\ P_4 \end{pmatrix} \quad (8)$$

Figure 5:
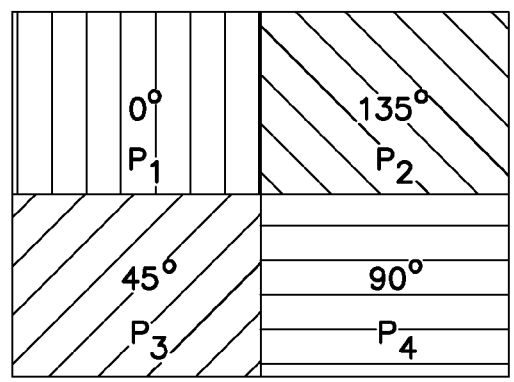
FIG. 5 is a diagram of one example of a perfectly aligned pixelated polarizer array according to aspects of the invention.

According to another example, the response for a perfectly aligned polarizer array, as illustrated in FIG. 5, is given by:

$$\vec{P} = \vec{W}_p \cdot \vec{S} = \begin{pmatrix} P_1 \\ P_2 \\ P_3 \\ P_4 \end{pmatrix} = \begin{pmatrix} 1 & \cos 2\theta_1 & \sin 2\theta_1 \\ 1 & \cos 2\theta_2 & \sin 2\theta_2 \\ 1 & \cos 2\theta_3 & \sin 2\theta_3 \\ 1 & \cos 2\theta_4 & \sin 2\theta_4 \end{pmatrix} \begin{pmatrix} S_0 \\ S_1 \\ S_2 \end{pmatrix} \quad (9)$$

In the illustrated example, $\theta_1 = 0°$, $\theta_2 = 135°$, $\theta_3 = 45°$ and $\theta_4 = 90°$. Those skilled in the art will appreciate, given the benefit of this disclosure, that only three angles, rather than four, may be needed to determine $S_0$, $S_1$, and $S_2$, and that each row in the matrix $W_p$ is the top row of the Mueller matrix for a linear polarizer at $\theta_i$. The parameters $S_x$ are the Stokes vector elements. The degree of linear polarization (DoLP) is given by:

$$DoLP = \frac{\sqrt{S_1^2 + S_2^2}}{S_0} \qquad (10)$$

For the above-mentioned examples of angular values (corresponding to the example shown in FIG. 5), from Equation (9) $W_p$ is calculated to be as follows:

$$\vec{W}_p = \begin{pmatrix} 1 & 1 & 0 \\ 1 & 0 & -1 \\ 1 & 0 & 1 \\ 1 & -1 & 0 \end{pmatrix} \qquad (11)$$

As discussed above, the data reduction matrix M is given by the pseudoinverse of $W_p$ and for this example can therefore be calculated from Equation (11) as:

$$\vec{M} = \vec{W}_p^{-1} = \begin{pmatrix} 1/4 & 1/4 & 1/4 & 1/4 \\ 1/2 & 0 & 0 & -1/2 \\ 0 & -1/2 & 1/2 & 0 \end{pmatrix} \qquad (12)$$

S can be determined from M and P.

Figure 6:
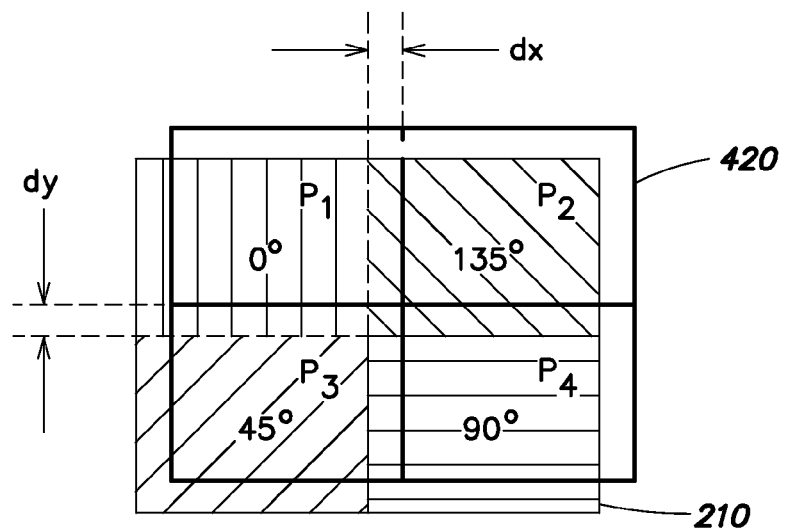
FIG. 6 is a diagram of one example of a laterally misaligned pixelated polarizer array according to aspects of the invention.

Referring to FIG. 6, consider an example of a transverse misaligned polarizer array. In the illustrated example, the polarizer array 210 is laterally misaligned relative to the detector array 420 in the x and y dimensions by amounts dx and dy, respectively. The values of dx and dy may be zero or non-zero. For this example, $W_p$ is as shown below:

$$\vec{P} = \vec{W}_p \cdot \vec{S} = \begin{pmatrix} P_1 \\ P_2 \\ P_3 \\ P_4 \end{pmatrix} = \begin{pmatrix} 1 & \sum_{x=1}^{4} f_{x-1}\cos2\theta_x & \sum_{x=1}^{4} f_{x-1}\sin2\theta_x \\ 1 & \sum_{x=1}^{4} f_{x-2}\cos2\theta_x & \sum_{x=1}^{4} f_{x-2}\sin2\theta_x \\ 1 & \sum_{x=1}^{4} f_{x-3}\cos2\theta_x & \sum_{x=1}^{4} f_{x-3}\sin2\theta_x \\ 1 & \sum_{x=1}^{4} f_{x-4}\cos2\theta_x & \sum_{x=1}^{4} f_{x-4}\sin2\theta_x \end{pmatrix} \begin{pmatrix} S_0 \\ S_1 \\ S_2 \end{pmatrix} \qquad (13)$$

In Equation (13), $f_{x-i}$ is a function describing the fractional area overlap of the filter pixel at angle x over detector pixel i. Similar to the color example discussed above, the output of each detector pixel $P_i$ is the sum of the output of every filter pixel that overlaps it, weighted by the overlap area. The data reduction matrix M can be calculated from Equation (13) as the pseudoinverse of $W_p$. In this example, the extinction ration (ER) for the ith detector pixel can be computed as:

$$ER = \frac{1 + \sqrt{\left(\sum_{x=1}^{4} f_{x-i}\cos2\theta_x\right)^2 + \left(\sum_{x=1}^{4} f_{x-i}\sin2\theta_x\right)^2}}{1 - \sqrt{\left(\sum_{x=1}^{4} f_{x-i}\cos2\theta_x\right)^2 + \left(\sum_{x=1}^{4} f_{x-i}\sin2\theta_x\right)^2}} \qquad (14)$$

Thus, based on either a known or measured position of the pixelated filter array 150 (that provides the values dx and dy of lateral misalignment) and measurements ($\vec{P}$) from the detector array 130, the data reduction matrix M can be computed and used to extract desired content (S) from the image of the scene. The data reduction matrix can be computed to account for any lateral misalignment of the pixelated filter array 150 relative to the image plane, as discussed above. This allows some latitude in the placement of the pixelated filter array 150 within the imaging system. In addition, in examples in which the shutter mechanism includes a position encoder, the algorithms can account for movement of the pixelated filter array, for example, as may be induced by movement of the imaging system or changes over time in the repeatability of the shutter mechanism.

In other examples, modifications to the $f_{x-i}$ terms in Equation (6) may be made to account for other errors or misalignment associated with the pixelated filter array. For example, as will be appreciated by those skilled in the art, given the benefit of this disclosure, the $f_{x-i}$ terms in Equation (6) may be modified to account for rotational misalignment of the pixelated filter array. In addition, manufacturing defects in the pixelated filter array may be accounted for by computing appropriate $f_{x-i}$ terms for Equation (6).

Figure 7:
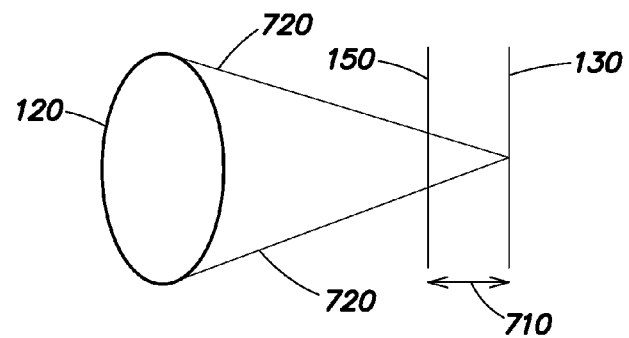
FIG. 7 is a diagram of an axially misaligned pixelated filter array according to aspects of the invention.
Figure 8:
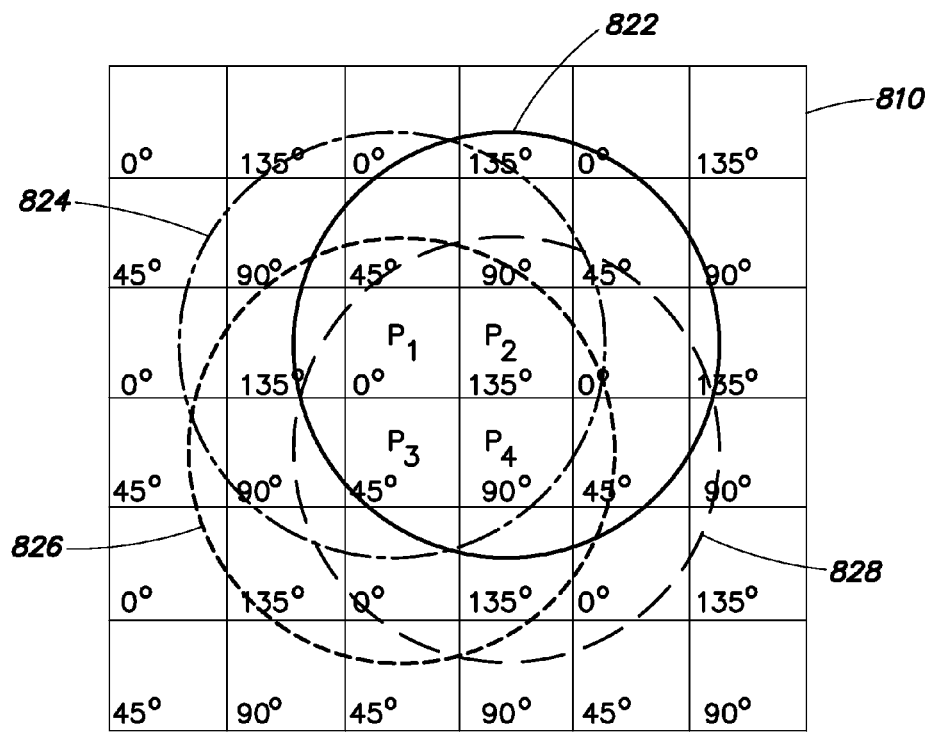
FIG. 8 is a diagram illustrating the effect of axial misalignment of a pixelated filter array relative to a detector array according to aspects of the invention.

As discussed above, the data reduction algorithms can account for both lateral (transverse) and axial misalignment of the pixelated filter array with respect to the imaging detector (or image plane). Referring to FIG. 7 there is illustrated a diagram of a portion of an imaging system in which the filter array 150 is axially misaligned with the detector array 130. In other words, there is an axial distance 710 between the detector array 130 (at the image plane) and the filter array 150. The foreoptics 120 focuses light 720 onto the image plane; however, at the filter array, the light may not be in focus due to the misalignment distance 710. FIG. 8 illustrates an example of axial misalignment of a polarization filter array 810 with respect to the detector array 420 (including pixels $P_1$, $P_2$, $P_3$, and $P_4$). Circles 822, 824, 826 and 828 represent the footprint of the light beams on the filter array 810. Each of the light beams 822, 824, 826 and 828 is focused on a corresponding one of the pixels $P_1$, $P_2$, $P_3$, and $P_4$ of the detector array; however, due to the axial misalignment 710, the footprint of each beam coves multiple pixels of the pixelated polarization array 810, as shown in FIG. 8.

For this example, a measurement matrix $W_p$ can be determined as shown below:

$$\vec{P} = \vec{W}_p \cdot \vec{S} = \begin{pmatrix} P_1 \\ P_2 \\ P_3 \\ P_4 \end{pmatrix} = \begin{pmatrix} 1 & \sum_{x=1}^{4} f_{x-1}\cos2\theta_x & \sum_{x=1}^{4} f_{x-1}\sin2\theta_x \\ 1 & \sum_{x=1}^{4} f_{x-2}\cos2\theta_x & \sum_{x=1}^{4} f_{x-2}\sin2\theta_x \\ 1 & \sum_{x=1}^{4} f_{x-3}\cos2\theta_x & \sum_{x=1}^{4} f_{x-3}\sin2\theta_x \\ 1 & \sum_{x=1}^{4} f_{x-4}\cos2\theta_x & \sum_{x=1}^{4} f_{x-4}\sin2\theta_x \end{pmatrix} \begin{pmatrix} S_0 \\ S_1 \\ S_2 \end{pmatrix} \qquad (15)$$

In Equation (15), $f_{x-i}$ is a function describing the area of all filter pixels of angle x (as a fraction of the area of the footprint of the beam on the filter array) for detector pixel i. As in the examples discussed above, the data reduction matrix M can be computed from the pseudoinverse of $W_p$ and can be used to extract the desired content vector S from the measured response P of the detector array. Although the data reduction matrix M may be used to accommodate any degree of axial misalignment, the closer the filter array 150 is positioned to the detector array 130 or a conjugate image plane of the detector array, the less noisy the data reduction will be.

Figure 9:
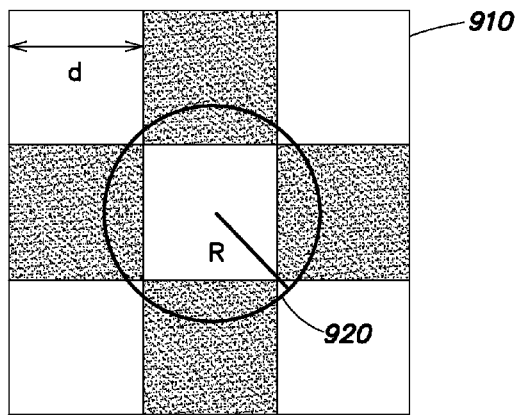
FIG. 9 is a diagram of one example of a pixelated Neutral Density (ND) filter array.
Figure 10:
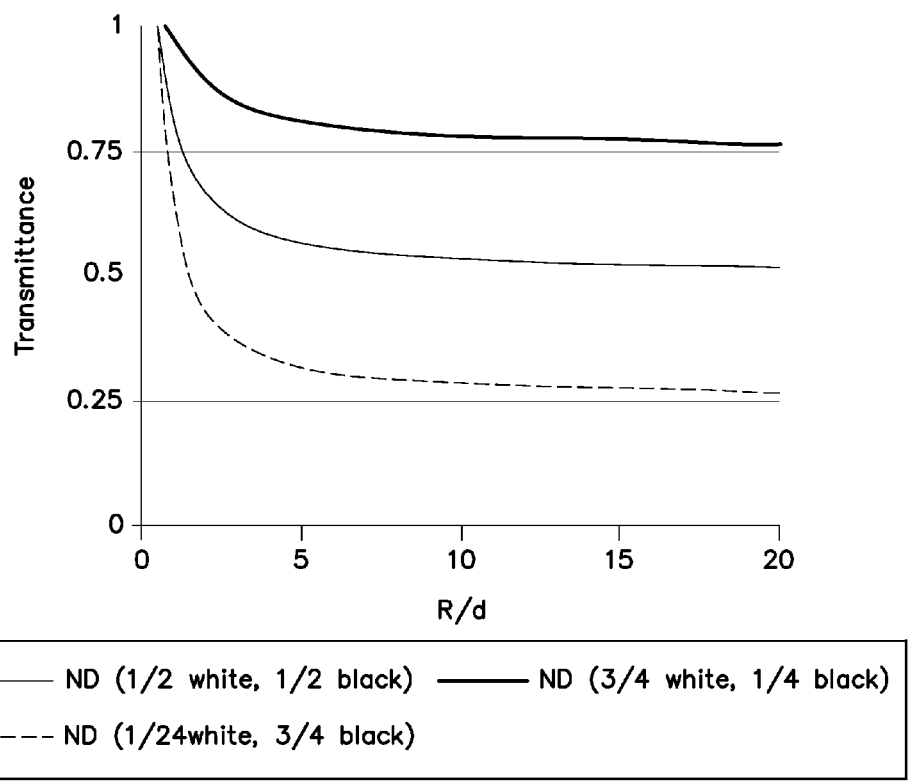
FIG. 10 is a graph illustrating examples of system transmittance as a function of beam footprint on a pixelated filter array, according to aspects of the invention.

According to another embodiment, embodiments of the data reduction algorithms discussed herein may be used to estimate wavefront error. Referring to FIG. 9, there is illustrated an example of a pixelated ND filter array 910 that is used to alter transmittance of the electromagnetic radiation through the imaging system. In FIG. 9, black pixels represent areas of 0% transmittance, and white pixels represent areas of 100% transmittance. In an optical imaging system, the quality or sharpness of focus of the image varies as a function of field angle, with the image generally being clearer at the center of the field than at the edges. The wider the field of view of the imaging system, the more difficult it may be to achieve a sharp image over the entire field due to aberrations in the system (e.g., spherical aberration, coma, astigmatism, etc.). Additionally, the size of the footprint 920 of the optical beam on the pixelated filter array 910 changes as a function of field angle due to aberrations in the imaging system. This changing size of the footprint 920 results in a transmittance variation over the field. For example, FIG. 10 illustrates examples of transmittance as a function of the radius (R) of the footprint 920 divided by the size of the pixels (d) for different positions of the footprint over the pixelated ND filter array.

According to one embodiment, the change in transmittance may be detected and used to estimate wavefront error in the imaging system. For example, the detected changes in transmittance may be used to estimate how good the focus of the beam on the array is, which in turn may provide distance information (e.g., range to an object or target), since focus changes with distance to the object being imaged. In some examples, a calibration source (e.g., a spatially uniform scene of known radiance, polarization and/or spectrum) may be used to obtain a baseline measurement of transmittance as a function of field angle, such that changes in the measured transmittance can be used for wavefront error sensing. Wavefront sensing may be used for many purposes including, for example, to correct for aerothermal heating of the imaging system, to correct for misalignment introduced into the imaging system over time, and/or to refocus targets that are within the hyperfocal distance.

As discussed above, the measurement matrix $W_p$ may be determined during a calibration or set-up of the imaging system, or dynamically during operation of the system. For example, the shutter mechanism may include a position encoder that reads out a position of the pixelated filter array 150 and provides this information to the controller 170. The position information may be used to determine the present misalignment of the pixelated filter array 150 and to calculate the data reduction matrices. The calculation process may be repeated each time the pixelated filter array is moved into the optical path 160. In another example, if the selected shutter mechanism 140 is sufficiently repeatable in positioning of the pixelated filter array 150 in the optical path 160, the misalignment (axial and/or lateral) of the filter array may be known, and the data reduction matrices may be calculated ahead of time, and used by the controller 170 during processing of the measured data from the detector array 130. For example, the matrices maybe determined from a raytrace of the imaging system (or of at least a relevant portion thereof).

The following example demonstrates determining the measurement matrix $W_p$ (from which the data reduction matrix M can be determined, as discussed above) from a raytrace using a four-pixel detector array 420, which is considered a "super-pixel" of the larger overall detector array 130, and a pixelated ND filter array.

$$\vec{P} = \vec{W}_p \cdot \vec{S} = \begin{pmatrix} P_1 \\ P_2 \\ P_3 \\ P_4 \end{pmatrix} = \begin{pmatrix} m_{00} & m_{01} & m_{02} \\ m_{10} & m_{11} & m_{12} \\ m_{20} & m_{21} & m_{22} \\ m_{30} & m_{31} & m_{32} \end{pmatrix} \begin{pmatrix} S_0 \\ S_1 \\ S_2 \end{pmatrix} \quad (16)$$

In Equation (16) $m_{x0}$ is unpolarized transmittance $\tau$ of the system (neglecting any transmittance differences between adjacent pixels of the array). Manipulating Equation (16) produces:

$$\begin{pmatrix} P_1 \\ P_2 \\ P_3 \\ P_4 \end{pmatrix} = \tau \begin{pmatrix} 1 & m'_{01} & m'_{02} \\ 1 & m'_{11} & m'_{12} \\ 1 & m'_{21} & m'_{22} \\ 1 & m'_{31} & m'_{32} \end{pmatrix} \begin{pmatrix} S_0 \\ S_1 \\ S_2 \end{pmatrix} \quad (17)$$

In Equation (17), $m_{xy}' = m_{xy}\tau$. Assuming a normalized Stokes vector ($S_0=1$) and re-arranging provides:

$$\begin{pmatrix} P_1/\tau - 1 \\ P_2/\tau - 1 \\ P_3/\tau - 1 \\ P_4/\tau - 1 \end{pmatrix} = \tau \begin{pmatrix} S_1 m'_{01} & S_2 m'_{02} \\ S_1 m'_{11} & S_2 m'_{12} \\ S_1 m'_{21} & S_2 m'_{22} \\ S_1 m'_{31} & S_2 m'_{32} \end{pmatrix} \quad (18)$$

In Equation (18), there are eight unknown quantities ($m_{xy}'$) and therefore eight equations are needed to solve for the eight unknowns. This equation set may be structured as follows:

$$\begin{pmatrix} P_{1A}/\tau - 1 \\ P_{1B}/\tau - 1 \\ P_{2A}/\tau - 1 \\ P_{2B}/\tau - 1 \\ P_{3A}/\tau - 1 \\ P_{3B}/\tau - 1 \\ P_{4A}/\tau - 1 \\ P_{4B}/\tau - 1 \end{pmatrix} = \begin{pmatrix} S_{1A} & S_{2A} & 0 & 0 & 0 & 0 & 0 & 0 \\ S_{1B} & S_{2B} & 0 & 0 & 0 & 0 & 0 & 0 \\ 0 & 0 & S_{1A} & S_{2A} & 0 & 0 & 0 & 0 \\ 0 & 0 & S_{1B} & S_{2B} & 0 & 0 & 0 & 0 \\ 0 & 0 & 0 & 0 & S_{1A} & S_{2A} & 0 & 0 \\ 0 & 0 & 0 & 0 & S_{1B} & S_{2B} & 0 & 0 \\ 0 & 0 & 0 & 0 & 0 & 0 & S_{1A} & S_{2A} \\ 0 & 0 & 0 & 0 & 0 & 0 & S_{1B} & S_{2B} \end{pmatrix} \begin{pmatrix} m'_{01} \\ m'_{02} \\ m'_{11} \\ m'_{12} \\ m'_{21} \\ m'_{22} \\ m'_{31} \\ m'_{32} \end{pmatrix} \quad (19)$$

To solve Equation (19), two Stokes vectors, $S_A$ and $S_B$ are needed. Equation (19) may be rewritten as:

$$\vec{P}' = \vec{C} \cdot \vec{D} \quad (20)$$

The vector D can then be solved as.

$$\vec{D} = \vec{C}^{-1} \cdot \vec{P}' \quad (21)$$

The Stokes vector is given by:

$$\begin{pmatrix} S_0 \\ S_1 \\ S_2 \end{pmatrix} = \begin{pmatrix} 1 \\ \cos 2\theta \\ \sin 2\theta \end{pmatrix} \quad (22)$$

For the purposes of illustration, in one example, $\theta=22.5°$ may be selected for $S_A$, and $\theta=-22.5°$ may be selected for $S_B$. For this example, the matrix C becomes as shown below and is also its own inverse:

$$\vec{C} = \frac{1}{\sqrt{2}} \begin{pmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & 1 \\ 0 & 0 & 0 & 0 & 0 & 0 & 1 & -1 \end{pmatrix} = \vec{C}^{-1} \quad (23)$$

Figure 11:
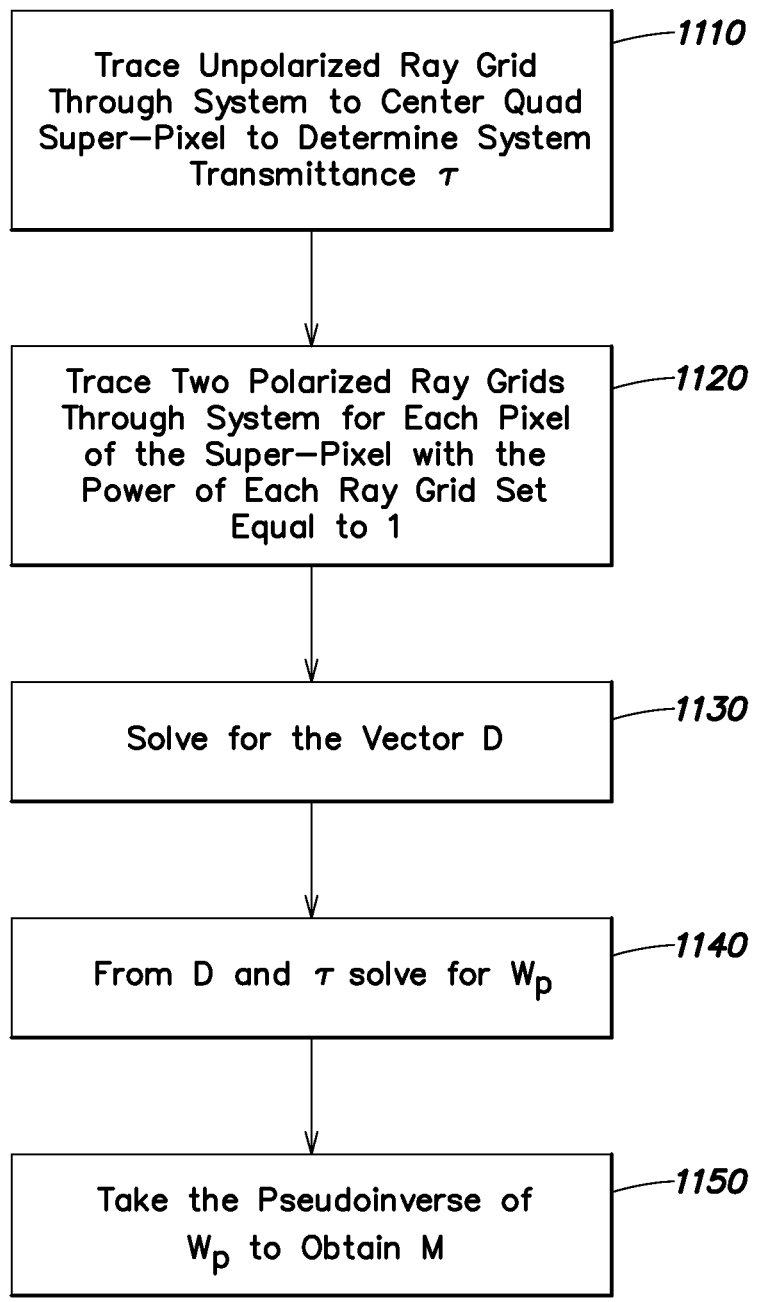
FIG. 11 is a flow diagram of one example of an imaging method according to aspects of the invention.

Thus, referring to FIG. 11, for the above example, the following steps may be taken to compute $W_p$. In step 1110, an unpolarized ray grid is traced through the imaging system to the center quad "super-pixel" of the detector array 130 to determine the transmittance $\tau$. In one example, step 1110 need be performed for only one pixel of the super-pixel 420. Trace two polarized ray grids through the system for each of the four pixels ($P_1$, $P_2$, $P_3$, and $P_4$) of the super-pixel, one at 22.5° linear polarization ($S_A$) and the other at −22.5° linear polarization ($S_B$), and set the power of each ray grid equal to 1 (step 1120). These eight raytraces provide the vector P ($P_{1A}$, $P_{1B}$, etc.). Using P and C, solve for the vector D (step 1130) in Equation (21). From D and $\tau$, Equation (16) can be solved for $W_p$ (step 1140). As discussed above, the data reduction matrix M is given by the pseudoinverse of $W_p$ (step 1150).

According to another example, $W_p$ may be determined from a raytrace using three of the four pixels of array 420. In this example:

$$\vec{P} = \vec{W}_p \cdot \vec{S} = \begin{pmatrix} P_1 \\ P_2 \\ P_3 \end{pmatrix} = \begin{pmatrix} m_{00} & m_{01} & m_{02} \\ m_{10} & m_{11} & m_{12} \\ m_{20} & m_{21} & m_{22} \end{pmatrix} \begin{pmatrix} S_0 \\ S_1 \\ S_2 \end{pmatrix} \quad (24)$$

In Equation (24), $m_{x0}$ is the unpolarized transmittance $\tau$ of the system (neglecting any transmittance differences between adjacent pixels of the super-pixel array 420). Rearranging Equation (24) provides:

$$\begin{pmatrix} P_1 \\ P_2 \\ P_3 \end{pmatrix} = \tau \begin{pmatrix} 1 & m'_{01} & m'_{02} \\ 1 & m'_{11} & m'_{12} \\ 1 & m'_{21} & m'_{22} \end{pmatrix} \begin{pmatrix} S_0 \\ S_1 \\ S_2 \end{pmatrix} \quad (25)$$

In Equation (25), $m_{xy}' = m_{xy}/\tau$. Assuming a normalized Stokes vector ($S_0=1$) and re-arranging provides:

$$\begin{pmatrix} P_1/\tau - 1 \\ P_2/\tau - 1 \\ P_3/\tau - 1 \end{pmatrix} = \tau \begin{pmatrix} S_1 m'_{01} & S_2 m'_{02} \\ S_1 m'_{11} & S_2 m'_{12} \\ S_1 m'_{21} & S_2 m'_{22} \end{pmatrix} \quad (26)$$

In Equation (26), there are six unknown quantities ($m_{xy}'$) and therefore six equations are needed to solve for the six unknowns. This equation set may be structured as follows:

$$\begin{pmatrix} P_{1A}/\tau - 1 \\ P_{1B}/\tau - 1 \\ P_{2A}/\tau - 1 \\ P_{2B}/\tau - 1 \\ P_{3A}/\tau - 1 \\ P_{3B}/\tau - 1 \end{pmatrix} = \begin{pmatrix} S_{1A} & S_{2A} & 0 & 0 & 0 & 0 & 0 & 0 \\ S_{1B} & S_{2B} & 0 & 0 & 0 & 0 & 0 & 0 \\ 0 & 0 & S_{1A} & S_{2A} & 0 & 0 & 0 & 0 \\ 0 & 0 & S_{1B} & S_{2B} & 0 & 0 & 0 & 0 \\ 0 & 0 & 0 & 0 & S_{1A} & S_{2A} & 0 & 0 \\ 0 & 0 & 0 & 0 & S_{1B} & S_{2B} & 0 & 0 \end{pmatrix} \begin{pmatrix} m'_{01} \\ m'_{02} \\ m'_{11} \\ m'_{12} \\ m'_{21} \\ m'_{22} \end{pmatrix} \quad (27)$$

Similar to the above example, to solve Equation (27), two Stokes vectors, $S_A$ and $S_B$ are needed. As above, Equation (27) may be rewritten as:

$$\vec{P}' = \vec{C} \cdot \vec{D} \quad (28)$$

Equation (28) may then be rewritten as Equation (21) above. The Stokes vector is again given by Equation (22) above.

For the purposes of illustration, in one example, $\theta=22.5°$ may be selected for $S_A$, and $\theta=-22.5°$ may be selected for $S_B$. For this example, the matrix C becomes as shown below and is also its own inverse:

$$\vec{C} = \frac{1}{\sqrt{2}} \begin{pmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 0 \\ 0 & 0 & 0 & 0 & 1 & -1 & 0 & 0 \end{pmatrix} = \vec{C}^{-1} \quad (29)$$

Thus, referring again to FIG. 11, for the above example, the following steps may be taken to compute $W_p$. In step 1110, an unpolarized ray grid is traced through the imaging system to the center quad "super-pixel" of the detector array 130 to determine the transmittance $\tau$. In one example, step 1110 need be performed for only one pixel of the super-pixel 420. Trace two polarized ray grids through the system for three of the four pixels ($P_1$, $P_2$, and $P_3$) of the super-pixel, one at 22.5° linear polarization ($S_A$) and the other at −22.5° linear polarization ($S_B$), and set the power of each ray grid equal to 1 (step 1120). These six raytraces provide the vector P ($P_{1A}$, $P_{1B}$, etc.). Using P and C, solve for the vector D (step 1130) in Equation (21). From D and $\tau$, Equation (16) can be solved for $W_p$ (step 1140). As discussed above, the data reduction matrix M is given by the pseudoinverse of $W_p$ (step 1150).

Thus, aspects and embodiments provide a system and methods for providing a using a movable pixelated filter array in an optical imaging system. A shutter mechanism may be used to move the filter array into and out of the optical path, and data reduction algorithms may be used to account for any axial and/or lateral misalignment of the pixelated filter array with respect to the imaging detector array (or a conjugate image plane). In one embodiment, the shutter mechanism 140 may be configured to accommodate multiple pixelated filter arrays which may be alternately switched into and out of the optical path 160. For example, the system may include one or more polarizer arrays, ND arrays, Bayer arrays, etc. Each array may be independently switched into and out of the optical path 160. Known or measured positions of the filter arrays may be used to compute the respective data reduction matrices M, as discussed above, which may then be used to process the data measured by the detector array 130. In addition, as discussed above, in various embodiments, measurements of varying system transmittance with field angle may be used to estimate wavefront error in the system, thereby providing another useful advantage.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging system comprising:
   an imaging detector array configured to provide image signals responsive to electromagnetic radiation impinging on the imaging detector array;
   a shutter mechanism;
   a pixelated filter array coupled to the shutter mechanism, the shutter mechanism being configured to selectively move the pixelated filter array into and out of an optical path leading to the imaging detector array; and
   a controller coupled to the imaging detector array and configured to receive and process the image signals to compensate for axial and/or lateral misalignment of the pixelated filter array with respect to at least one of the imaging detector array and a conjugate image plane of the imaging detector array.

2. The optical imaging system of claim 1, wherein the imaging detector array is a focal plane array comprising a plurality of detector pixels arranged in a grid format.

3. The optical imaging system of claim 2, wherein the pixelated filter array comprises a plurality of filter pixels arranged in a grid format, the filter pixels being approximately the same size as the detector pixels.

4. The optical imaging system of claim 1, further comprising foreoptics configured to focus the electromagnetic radiation onto the imaging detector, the optical path being between the foreoptics and the imaging detector.

5. The optical imaging system of claim 1, wherein the electromagnetic radiation is infrared radiation.

6. The optical imaging system of claim 1, wherein the controller is configured to compute a data reduction matrix based at least in part on a known misalignment of the pixelated filter array, and to process the image signals using the data reduction matrix.

7. The optical imaging system of claim 6, wherein the shutter mechanism includes a position encoder configured to provide a position of the pixelated filter array in the optical path, wherein the controller is coupled to the position encoder and configured to receive the position of the pixelated filter array and to determine the known misalignment of the pixelated filter array.

8. The optical imaging system of claim 1, wherein the pixelated filter array is one of a Bayer filter array, a polarizer array, and a neutral density array.

9. An imaging method comprising:
   selectively moving a pixelated filter array into an optical path of an imaging detector in an imaging system, the imaging detector including a plurality of pixels;
   measuring a response from the imaging detector when the pixelated filter array is positioned in the optical path to obtain a first vector;
   determining a misalignment of the pixelated filter array with respect to the imaging detector;
   calculating a data reduction matrix based on the misalignment of the pixelated filter array; and
   processing the first vector using the data reduction matrix to extract selected content from the response of the imaging detector.

10. The imaging method of claim 9, wherein determining the misalignment of the pixelated filter array includes receiving axial and/or lateral position information for the pixelated filter array from a position encoder coupled to a mechanism configured to move the pixelated filter array into and out of the optical path.

11. The imaging method of claim 9, wherein calculating the data reduction matrix includes:
    tracing an unpolarized ray grid through a representation of the imaging system to a center quad super-pixel of the imaging detector, the super-pixel including four pixels of the plurality of pixels;
    tracing first and second polarized ray grids through the imaging system for at least three of the four pixels of the super-pixel to provide a measurement vector, the first polarized ray grid being at a first linear polarization, and the second polarized ray grid being at a second linear polarization; and
    based on the measurement vector, determining the data reduction matrix.

12. The imaging method of claim 11, wherein tracing the first and second polarized ray grids includes setting a power of each ray grid equal to one.

13. The imaging method of claim 11, wherein tracing the first and second polarized ray grids includes tracing the first and second polarized ray grids through the imaging system for each of the four pixels of the super-pixel to provide the measurement vector.

14. The imaging method of claim 11, wherein determining the data reduction matrix includes using the measurement vector and known values of the first and second linear polarizations to determine a measurement matrix, and obtaining the pseudoinverse of the measurement matrix to provide the data reduction matrix.

15. The imaging method of claim 9, further comprising:
    measuring a system transmittance for the pixelated filter array positioned in the optical path;
    and
    estimating a wavefront error value based on the system transmittance and the data reduction matrix.

* * * * *